US012800755B2

(12) United States Patent
Tanaka

(10) Patent No.: US 12,800,755 B2
(45) Date of Patent: Nov. 17, 2026

(54) IMAGE ANALYSIS DEVICE AND IMAGE ANALYSIS METHOD

(71) Applicant: NEC Corporation, Tokyo (JP)

(72) Inventor: Taichi Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 372 days.

(21) Appl. No.: 18/569,738

(22) PCT Filed: Jun. 22, 2021

(86) PCT No.: PCT/JP2021/023597
§ 371 (c)(1),
(2) Date: Dec. 13, 2023

(87) PCT Pub. No.: WO2022/269754
PCT Pub. Date: Dec. 29, 2022

(65) Prior Publication Data
US 2024/0280689 A1 Aug. 22, 2024

(51) Int. Cl.
*G01S 13/90* (2006.01)

(52) U.S. Cl.
CPC ................................ *G01S 13/9021* (2019.05)

(58) Field of Classification Search
CPC ...... G01S 13/913; G01S 13/872; G01S 13/89; G01S 13/90; G01S 13/9021
See application file for complete search history.

(56) References Cited

U.S. PATENT DOCUMENTS

| | | | | |
|---|---|---|---|---|
| 2004/0099819 A1* | 5/2004 | Yamaguchi | ......... | H01J 37/3045 250/491.1 |
| 2016/0232423 A1* | 8/2016 | Zhong | ................ | B60H 1/00735 |
| 2019/0107785 A1* | 4/2019 | Javaheri | .............. | G03F 7/70633 |

FOREIGN PATENT DOCUMENTS

| | | | |
|---|---|---|---|
| CN | 106093939 | A | 11/2016 |
| JP | 2003-500658 | A | 1/2003 |
| WO | 2015/151134 | A1 | 10/2015 |
| WO | 2017/032977 | A1 | 3/2017 |
| WO | 2017/126547 | A1 | 7/2017 |
| WO | 2021/024336 | A1 | 2/2021 |

OTHER PUBLICATIONS

International Search Report for PCT Application No. PCT/JP2021/023597, mailed on Sep. 21, 2021.
Ricardo Lanari, et al., “A Small-Baseline Approach for Investigating Deformations on Full-Resolution Differential SAR Interferograms”, IEEE Transactions on Geoscience and Remote Sensing, vol. 42, No. 7, pp. 1377-1386, Jul. 2004.
Fabrizio Lombardini, et al., “New developments of 4D+ differential SAR tomography to probe complex dynamic scenes”, IEEE Igarss, pp. 3362-3365, 2014.

(Continued)

*Primary Examiner* — Timothy A Brainard
(74) *Attorney, Agent, or Firm* — Sughrue Mion, PLLC

(57) ABSTRACT

The image analysis device includes a signal separation unit 10 which inputs a plurality of radar images in which the same area is captured and a phase gradient model representing a phase difference between a plurality of nearby pixels on a surface of an object to be analyzed that may exist in the radar image, and extracts from the radar image a component consistent with the phase difference represented by the phase gradient model.

9 Claims, 10 Drawing Sheets

(56) References Cited

OTHER PUBLICATIONS

JP Office Action for JP Application No. 2023-529274, mailed on Feb. 12, 2025 with English Translation.

Wen Liu et al., "Height Estimation for High-rise Buildings from Intensity and Phase Information of High-resolution SAR Imagery", Journal of the Remote Sensing Society of Japan, vol. 38, No. 2, Apr. 20, 2018, pp. 149-162.

* cited by examiner

IMAGE ANALYSIS DEVICE AND IMAGE ANALYSIS METHOD

This application is a National Stage Entry of PCT/JP2021/023597 filed on Jun. 22, 2021, the contents of all of which are incorporated herein by reference, in their entirety.

TECHNICAL FIELD

This invention relates to an image analysis device and an image analysis method for analyzing deformation, etc. based on radar images.

BACKGROUND ART

There is a change detection technology that detects areas where the state of the ground surface has changed based on images taken from high altitudes, such as images taken by satellites.

Synthetic aperture radar (SAR) technology is a technology which can obtain an image (hereinafter referred to as a SAR image) equivalent to the image by an antenna having a large aperture, when a radar mounted on a flying object such as an artificial satellite, an aircraft, or the like transmits and receives a radio wave while the flying object moves. The synthetic aperture radar is utilized, for example, for analyzing a ground surface deformation by signal processing of reflected waves from the ground surface, etc. The ground surface shall include not only the ground but also the surface (top surface) where a low structure such as a low-rise building exists.

An image taken by a flying object such as a satellite is called a radar image. A SAR image is an example of a radar image. Hereinafter, a flying object that transmits and receives electromagnetic waves is assumed to be a satellite, but a flying object is not limited to a satellite.

Interferometric SAR analysis is an effective method for detecting ground surface deformation. In the interferometric SAR analysis, the phase difference between radio signals of multiple (for example, two) SAR images taken at different times is calculated. Then, a change in distance between the flying object and the reflector that occurred during the imaging time period is detected.

SAR images can be affected by layover (refer to patent literature 1, for example). For example, when a transmission steel tower or a high-rise building exists in the observed area, a reflected wave from the transmission steel tower or the high-rise building is mixed with a reflected wave from the ground surface in the radar mounted on a satellite. As a result, the received waveform of the radar mounted on the satellite becomes unstable. Specifically, in a SAR image, layover of overlaying information of transmission steel tower on information of the ground surface may occur. In a situation where layover occurs, changes may occur among multiple SAR images even if no changes actually occur in the observed area.

Taking a transmission steel tower as an example, the reflection intensity of the radio wave from the transmission steel tower is often weaker than the reflection intensity of the radio wave from the ground surface. In other words, a transmission steel tower is a reflector that exhibits weak reflection. Therefore, the reflected wave from the transmission steel tower is blended with the reflected wave from the ground surface. As a result, when analyzing transmission towers using SAR images, it is difficult to analyze based on the phase of the tower (including information on the distance from the radar) due to the layover. The result is that when analyzing a transmission steel tower using SAR images, analysis based on the phase (including information on the distance from the radar) of the transmission steel tower becomes difficult due to the layover.

In general, deformation analysis using SAR images targets linear deformation. It is difficult to estimate nonlinear deformation of buildings (such as significant tilting in a short time or tipping over in a short time) caused by a scour due to flooding or an earthquake, for example.

CITATION LIST

Patent Literature

PTL 1: International Publication No. 2015/151134

CITATION LIST

Non Patent Literature

NPL 1: Ricardo Lanari, et al., "A Small-Baseline Approach for Investigating Deformations on Full-Resolution Differential SAR Interferograms", IEEE TRANSACTIONS ON GEOSCIENCE AND REMOTE SENSING, VOL. 42, NO. 7, pp. 1377-1386, JULY 2004

NPL 2: Fabrizio Lombardini, et al., "New developments of 4D+ differential SAR tomography to probe complex dynamic scenes", IEEE IGARSS, pp. 3362-3365, 2014

SUMMARY OF INVENTION

Technical Problem

As time series analysis, SBAS (Small BAseline Subset) is used (refer to non-patent literature 1, for example). SBAS is a method for estimating an amount of deformation using a large number of SAR interferograms with a small vertical baseline length and a short imaging date interval. By using SBAS, a deformation is extracted by filtering an absolute phase by applying a regression model or the like after a relative phase (phase that takes values between $-\pi$ and $\pi$) is converted (unwrapped) to an absolute phase. Such a method can also handle nonlinear deformations. However, such a method can only estimate the deformation of one specific reflector. Therefore, it is difficult to evaluate a phase of only a weakly reflecting reflector when both weakly and strongly reflecting reflectors are present, for example.

There are also methods that model in advance what phase change individual reflectors have over time using a deformation velocity and a height as parameters. For example, when using 4D tomography as described in non-patent literature 2, a time-varying phase change model is used. The phase change model is generated using 4D tomography and includes information on height. The actual observed signal (observed image) is compared with the pre-modeled phase change models. Then, the phase change model for each reflector that matches the observed signal is selected. In other words, the phase change model, which makes a difference between the observed signal which is a complex image and a complex number derived from the models less than a predetermined value, is selected. From each of the selected phase change models, the desired parameters are obtained.

Using such a technique, the deformation of each of the multiple reflectors can be obtained. In other words, even if a layover occurs, multiple reflectors (for example, a transmission steel tower and the ground surface) can be separated and their respective deformations can be obtained. However, if there is no phase change model that matches the observed signals it is not possible to separate multiple reflectors and estimate parameters. In addition, the method using 4D tomography is not suitable for use in estimating a nonlinear deformation of a particular reflector, because a linear model is generally provided as the phase change model of the reflector.

Further, as a method of using multiple models obtained in advance by utilizing modeling, there is a method of using 3D images generated using the MUSIC (Multiple Signal Classification) method or the Capon method. Another method is to use sparsification of observed signals (observed images) in combination.

In any of the known methods, it is difficult to separate the reflected wave from a high reflector such as a transmission steel tower from the reflected wave from the ground surface to be able to estimate the deformation of each (especially, the deformation of reflector such as a transmission steel tower), and to be able to deal with nonlinear deformation of the reflector. That is because even when using 4D tomography, it is difficult to generate an appropriate nonlinear model, for example.

It is an object of the present invention to provide an image analysis device and an image analysis method that can analyze a phase of a reflector exhibiting weak reflection and deal with a nonlinear deformation of the reflector, even when a reflector exhibiting weak reflection and a reflector exhibiting strong reflection are observed in a superimposed state.

Solution to Problem

The image analysis device according to the present invention includes signal separation means for inputting a plurality of radar images in which the same area is captured and a phase gradient model representing a phase difference between a plurality of nearby pixels on a surface of an object to be analyzed that may exist in the radar image, and extracting from the radar image a component consistent with the phase difference represented by the phase gradient model.

The image analysis method according to the present invention includes inputting a plurality of radar images in which the same area is captured and a phase gradient model representing a phase difference between a plurality of nearby pixels on a surface of an object to be analyzed that may exist in the radar image, and extracting from the radar image a component consistent with the phase difference represented by the phase gradient model.

The image analysis program according to the invention causes a computer to execute a process of inputting a plurality of radar images in which the same area is captured and a phase gradient model representing a phase difference between a plurality of nearby pixels on a surface of an object to be analyzed that may exist in the radar image, and a process of extracting from the radar image a component consistent with the phase difference represented by the phase gradient model.

Advantageous Effects of Invention

According to the present invention, a phase of a reflector exhibiting weak reflection can be analyzed a nonlinear deformation of the reflector can be dealt with, even when a reflector exhibiting weak reflection and a reflector exhibiting strong reflection are observed in a superimposed state.

DESCRIPTION OF EMBODIMENTS

Hereinafter, example embodiments of the present invention will be explained with reference to the drawings. In each example embodiment described below, a SAR image is used as an example of a radar image obtained using an electromagnetic wave, but the radar image is not limited to a SAR image. In addition, in each of the example embodiments described below, a transmission steel tower is used as an example of a reflector that exhibits weak reflection, but the reflector that exhibits weak reflection is not limited to a transmission steel tower.

Each of the example embodiments described below uses a spatial phase gradient model for a transmission steel tower. A spatial phase gradient model is a model that constrains the phase gradient between multiple nearby pixels in a SAR image. The signal separation unit described below determines that a part of the SAR image with a phase gradient consistent with the constraint (condition) is a surface belonging to a reflector (a transmission steel tower) that exhibits weak reflection. Therefore, the signal separation unit has a function of extracting from the SAR image the components with phase gradients that are consistent with the spatial phase gradient model.

Figure 1:
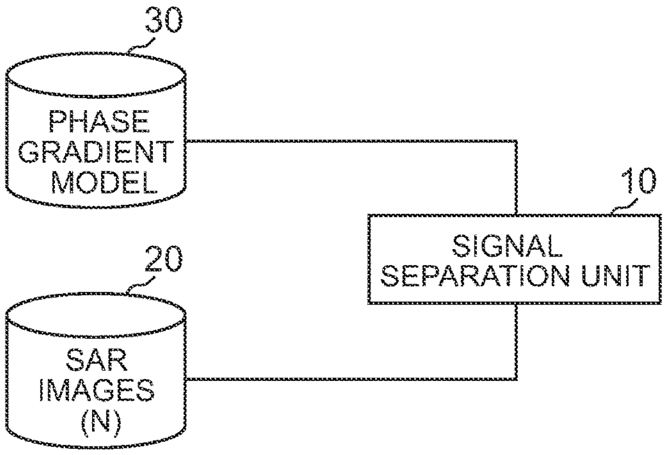
FIG. 1 It depicts a block diagram showing an overview of the example embodiment of the image analysis system.

FIG. 1 is a block diagram showing an overview of the example embodiment of the image analysis system. The image analysis device comprises a signal separation unit 10, a SAR image storage 20, and a phase gradient model storage 30.

The SAR image storage 20 stores N SAR images (for example, N=about 10 to 30) in which the same area is captured. Hereinafter, the SAR images stored in SAR image storage 20 are sometimes referred to as input SAR images or a group of input SAR images. N SAR images are radar images in which the same area is recorded, which were obtained at different times or in different orbits. Therefore, the SAR images stored in the SAR image storage 20 may be radar images obtained at different times but in the same orbit. The plurality of SAR images may be radar images obtained at the same time, although they were obtained in different orbits. Further, the plurality of SAR images may be radar images that are obtained at different times and in different orbits.

The input SAR image may be an image after the phase dependent on a known elevation model has been eliminated by Flattening. The elevation model used in Flattening may be a planar or spherical model.

The phase gradient model storage 30 stores a phase gradient model, that was generated in advance, for a reflector (a transmission steel tower). The signal separation unit 10 extracts signals consistent with the phase gradient model from each SAR image.

The phase gradient model is a model that reflects a three-dimensional shape of the object to be analyzed, a degree of thermal expansion that may occur, a degree of bending, etc., and defines how much phase difference multiple nearby points on the surface of the object to be analyzed can have on the SAR image, for example. The phase gradient model can be expressed as a probability model, an evaluation function, or a template array, for example. The template array is sometimes referred to as a template image.

The method of generating a phase gradient model is arbitrary, but for example, a phase gradient model can be generated by the following methods.

[Method 1: Generate a Probability Density Function (Phase-Difference Function) that Imposes a Constraint on the Phase Difference Between Nearby Pixels]

For example, let a phase of pixel p (phase to be observed at pixel p) and $\theta_{p+1}$ be a phase of neighboring pixel (p+1) (phase to be observed at pixel p+1) be $\theta_p$. The complex numbers with absolute value 1 corresponding to those phases are $s_p=\exp(j\theta_p)$ and $s_{p+1}=\exp(j\theta_{p+1})$. In the phase gradient model, it is constrained how much the difference between phase $\theta_p$ and phase $\theta_{p+1}$ should be. For example, when a pixel p and a pixel (p+1) exist in the object to be analyzed (reflector), a model having a phase difference which occurs with a probability in proportion to a function shown in equation (1) below is generated as the phase gradient model.

[Math. 1]

$$J(\theta_p, \theta_{p+1}) = g(\mathrm{Real}(k_p s_p \overline{s_{p+1}})) \tag{1}$$

In equation (1), $k_p$ represents a parameter that controls how much the intensity with which the phase difference between two pixels is constrained. g is a function that shows an increasing tendency, for example, an exponential function.

Equation (1) corresponds to a model that the phase difference $(\theta_p-\theta_{p+1})$ is close to the phase angle $\angle k_p$ when $k_p=|k_p|\exp(j\angle k_p)$. When $|k_p|$ is large, the difference between the phase difference $(\theta_p-\theta_{p+1})$ and the phase angle $\angle k_p$ is likely to be small, and when $|k_p|$ is small, the difference between the phase difference $(\theta_p-\theta_{p+1})$ and the phase angle $\angle k_p$ is likely to be large. For example, $|k_p|=0$ indicates that the phase difference is not constrained. $|k_p|=\infty$ indicates that the phase difference is constrained to be equal to the phase angle.

It should be noted that $k_p$ may be different for each SAR image. For example, whenf the object to be analyzed with three-dimensional height is taken from different orbits, $k_p$ may also vary depending on the orbit from which the SAR image was taken.

When the height of the object to be analyzed is significant (it has a height more than or equal to a predetermined value), the phase gradient generated according to the gradient of the three-dimensional height can be used as the phase gradient of the mode, for example.

It is known that a phase in a SAR image taken from a flying object depends on the orbit and the height of the object being photographed. For example, the orbit that passes closest to the center of all orbits among the orbits by which respective input SAR images were taken is the reference orbit. Let a projection (vertical baseline length) of the difference between the reference orbit and the orbit when the SAR image of interest (the nth SAR image) was taken, in the vertical direction of the line of sight from the satellite to the ground be $B_n$. Let a constant coefficient determined by the angle of incidence, etc., be $\alpha$. In that case, the phase at pixel p in SAR image n is calculated as $\alpha B_n h_p$ based on the height h at pixel p.

Let the difference in height of pixel p from the neighboring pixel (p+1) be $\Delta h_p=h_p-h_{p+1}$. The parameter $k_p$ which constrains the phase gradient between two nearby pixels is calculated as the appropriate constraint intensity $|k_p|$ and the phase difference $\angle k_p=\alpha B_n \Delta h_p$ according to the height gradient. The intensity of the constraint $|k_p|$ may be set smaller for object to be analyzed which degree of thermal expansion tends to increase or that is easy to bend, and larger for object to be analyzed that hardly ever expands or bends, for example.

[Method 2: Generate a Probability Density Function that Imposes a Constraint on the Phase Difference Between Nearby Multiple Pixels (3 or More Pixels)]

The above phase gradient model is a model generated by focusing on the phase difference between two nearby pixels. However, the constraint may be made on a larger number of nearby pixels. For example, the phase gradient may be constrained by an evaluation function (called the multi-pixel phase gradient evaluation function) shown in equation (2) using the complex vector $\vec{s}_p=(e^{j\theta p}, e^{j\theta p+1}, e^{j\theta p+2}, \ldots, e^{j\theta p+m})^T$ with phase $\theta_p, \theta_{p+1}, \theta_{p+2}, \ldots, \theta_{p+m}$ for pixel p and m (m≥3) pixels p+1, p+2, . . . , p+m nearby to it. In equation (2), the arrow → denotes a vector. T denotes a transpose. H denotes a complex conjugate transpose.

[Math. 2]

$$J(\vec{s_p}) = g(\vec{s}_p^{\,H} K_p \vec{s_p}) \tag{2}$$

In equation (2), $K_p$ is a complex matrix. The elements of the complex matrix $K_p$ are complex numbers that include the phase difference between pixels and a parameter that that controls how much the intensity with which the phase difference between pixels is constrained, similar to $K_p$ in the two-pixel case above. In other words, the evaluation function of equation (2) corresponds to a function that extends the probability density distribution in the two-pixel case to a multipixel probability density distribution.

Compared to the phase gradient model which constrains the phase difference between two pixels, the evaluation function of equation (2) can constrain higher-order differences. Therefore, it can be easily constrained to have a smoother phase gradient or to constrain a quantity such as curvature as the second derivative of phase.

As in the case of constraining the phase difference between two pixels, when constraining the phase difference between multiple pixels, $K_p$ can be defined by the orbit, the height at pixel p, etc. In the case of constraining the phase difference between multiple pixels, since the curvature can also be constrained, in addition to structures such as transmission steel towers, for example, regarding a dome with the shape of a split sphere, etc., it becomes to be possible to process to extract the phase of the dome ceiling by evaluating the matching degree of the model according to the curvature of the dome ceiling.

The function is not limited to the function of the form shown in equation (2). For example, $\Sigma_i a_{p,i}\theta_{p+i}$, or an unwrapped $W(\Sigma_i a_{p,i}\theta_{p+i})$ my be constrained. $a_{p,i}$ is a coefficient for the phase gradient calculation. When $a_{p,-1}=-1$, $a_p=2$, and $a_{p,+1}=-1$ are specified, $\Sigma_i a_{p,i}\,\theta_{p+i}$ becomes to be a value corresponding a second derivative in p of θ. Therefore, by constraining $\Sigma_i a_{p,i}\,\theta_{p+i}$, the phase gradient can be constrained to be constant gradient. Further, since the phase returns to the same value when 2π is added, $W(\Sigma_i a_{p,i}\,\theta_{p+i})$ can be used to constrain the phase difference, regardless of how many times the phase has cycled, by applying the function W to convert the phase to a value that cycles between −π and π, such as by calculating the remainder when the phase is divided by 2n.

[Method 3: Generate a Template Image]

The above two methods generate a phase gradient model based on matrices. However, a phase gradient model may be generated based on the concept of template matching. The template image as a phase gradient model according to method 3 is an image related to the phase gradient that the object to be analyzed should present.

For example, let the input SAR image be $I_{in}$. Let the template image be $I_{template}$. Then, the signal separation unit described below may use the following equation (3) to evaluate the object to be analyzed.

[Math. 3]

$$g\left(\left|\sum_{image} I_{in}\circ\overline{I_{template}}\right|\right) \tag{3}$$

In equation (3), "○" denotes the element-wise product. $\Sigma_{image}$ denotes the sum over the entire image; g denotes a monotonically increasing function. g outputs a large value when phase gradients match between the input SAR image and the template image, and a small value when the phase gradients differ. In other words, similar to methods 1 and 2 above, method 3 substantially constrains the phase gradient.

By positioning $I_{in}$ and $I_{template}$ to small areas in a single image, the local phase gradient may be evaluated. The local phase gradient may also be evaluated after weighting the sum of neighboring pixels of a particular pixel.

As a template image, an image taken in the past when no layover, etc., has occurred or an image taken in the past when layover, etc., has occurred, from which the effects of layover, etc., have been eliminated, is used. Therefore, when evaluating the object to be analyzed, orbit information of flying objects and three-dimensional shapes such as structures other than the object to be analyzed are not required.

Example Example Embodiment 1

Figure 2:
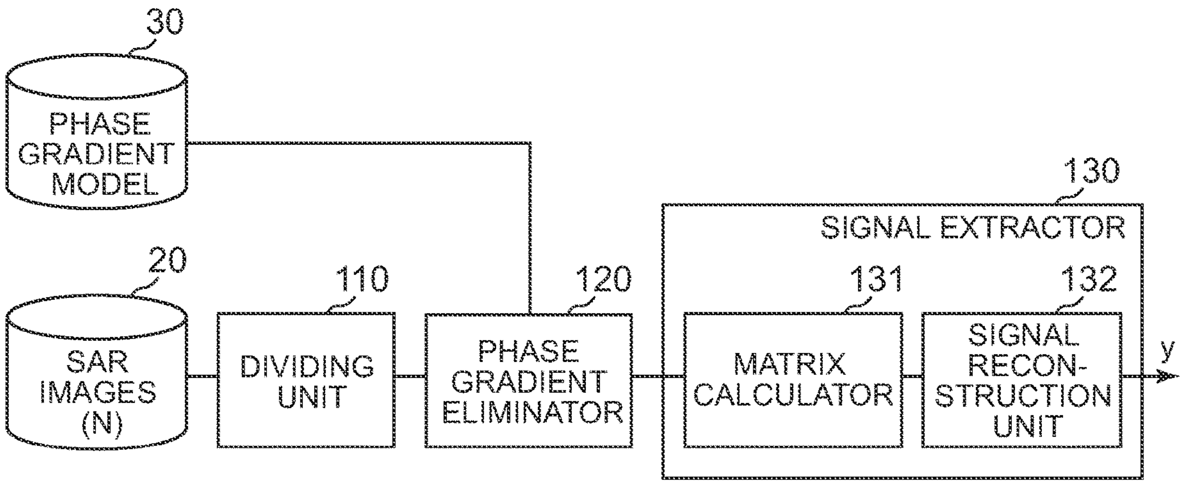
FIG. 2 It depicts a block diagram showing a configuration example of the image analysis device of the first example embodiment.

FIG. 2 is a block diagram showing an example configuration of the image analysis device of the first example embodiment. The image analysis device shown in FIG. 2 includes a dividing unit 110 that inputs SAR images from the SAR image storage 20, a phase gradient eliminator 120 that inputs a phase gradient model regarding the reflector of the object to be analyzed from the phase gradient model storage 30, and a signal extractor 130. The phase gradient model storage 30 stores in advance the phase gradient generated using one of the methods described above. The signal extractor 130 includes a matrix calculator 131 and a signal reconstruction unit 132.

The dividing unit 110 divides each SAR image into a plurality of small areas. The small area may partially overlap with another small area or other small areas. The phase gradient eliminator 120 eliminates the phase gradient of each small area according to the phase gradient model, for each SAR image.

The phase gradient eliminator 120 estimates a local phase gradient in each small area according to the phase gradient model and eliminates the estimated phase gradient.

The matrix calculator 131 in the signal extractor 130 calculates a specific matrix C for each small area, for each SAR image. Specifically, the matrix calculator 131 generates the matrix by adding a plurality of pixels (complex numbers) from which the phase gradient has been eliminated. The signal reconstruction unit 132 extracts a dominant component (for example, a principal component) from the generated matrix. The dominant component corresponds to the signal indicating the phase of the object to be analyzed. Therefore, the signal reconstruction unit 132 can obtain a signal related to the phase of the object to be analyzed.

Next, the operation of the image analysis device of this example embodiment will be explained with reference to the flowchart in FIG. 3.

The dividing unit 110 inputs SAR images stored in the SAR image storage 20. The dividing unit 110 divides each SAR image into small areas (step S101).

For each SAR image, the phase gradient eliminator 120 eliminates the phase gradient of each small area according to the phase gradient model (step S102). Specifically, the phase gradient eliminator 120 eliminates the phase gradient with the highest evaluation value calculated based on the phase gradient model. The phase gradient eliminator 120 may eliminate the phase gradient that takes the expected value of the value weighted by the evaluation value. The process of step S102 eliminates, for example, a phase that depends on the height of the object to be analyzed (the transmission steel tower).

When the phase gradient model is generated using the method 3 above, that is, when it is represented by a template image (template array), the phase gradient eliminator 120 shifts the phase of the entire template array in the process of step S102 so that the phase of the location in the template array that matches the center of the small area is 0. The template array after the phase shift corresponds to the optimal value of the phase difference with the surrounding pixels expected for the center of the small area. The phase gradient is eliminated by multiplying the complex conjugates of the template array after the phase shift by each pixel.

When the phase gradient model is generated using the method 1 above, that is, it is expressed as a phase difference function between neighboring pixels, in the process of step S102, the phase gradient eliminator 120 can obtain the optimal value of the phase difference with the surrounding pixels expected for the center of the small area by integrating the phase differences that $k_p$ has. Therefore, the phase gradient is eliminated as when the phase gradient model is represented by a template image.

Fixing the phase of the center of the small area to 0, the probability density of the phase of the surrounding pixel can be calculated using (4) below.

[Math. 4]

$$f(\theta_{p-d},\ \theta_{p+d}\} = Z\left[\prod_{m=1}^{d-1} g(\theta_{p+m+1},\ \theta_{p+m})\right] g(\theta_{p+1},\ 0)g(0,\ \theta_{p-1})\left[\prod_{l=1}^{d+1} g(\theta_{p-i}\theta_{p-l-1})\right] \tag{4}$$

The phase gradient eliminator 120 may eliminate the phase gradient by calculating the expected value of $e^{j\Theta p-d}$ to $e^{j\Theta p+d}$ by performing the calculation in equation (3) and multiplying the complex conjugates of the expected values by each pixel.

When the phase gradient model is generated using the method 2 above, that is, when the phase gradient model is represented by a multipixel phase gradient evaluation function, the phase gradient eliminator 120 performs phase gradient elimination in the process of step S102 in the same way as when the phase gradient model is generated using the above method 1, for example, with optimal values. The phase gradient eliminator 120 may eliminate the phase gradient using, for example, the expected value of other pixels when the phase of the interest pixel p is set to 0 for the multipixel phase gradient evaluation function.

The matrix calculator 131 calculates a specific matrix C for each small area (step S103). The predetermined matrix C can be expressed as in equation (5) below. In equation (5), f represents the mean in the small area, the sum in the small area, the mean in the small area after normalizing the absolute value of $x_m$, $x_n$ to 1, or the sum in the small area after normalizing the absolute value of $x_m$, $x_n$ to 1, etc.

[Math. 5]

$$C_{mn} = f[x_m\overline{x_n}] \tag{5}$$

The signal reconstruction unit 132 calculates a dominant component (dominant phase change) in the matrix C (step S104). For example, in step S104, the signal reconstruction unit 132 calculates as the dominant component a vector y that maximizes $y^H$ Cy and whose norm is constant or whose absolute value of all elements is 1. The signal reconstruction unit 132 may calculate the vector y that increases the value of $y^H$ Cy by the following equation (6), using the element-wise product of an appropriate real weight matrix W and the matrix C as the dominant component.

[Math. 6]

$$y^H(W \circ C)y \tag{6}$$

The signal reconstruction unit 132 outputs the vector y as a complex vector with the phase of the object to be analyzed (step S105). Vector y corresponds to a signal indicating the phase of the object to be analyzed.

The image analysis device performs steps S101-S105 for each of the N SAR images. Accordingly, the image analysis device outputs N complex vectors (vector y). N complex vectors can be used to perform deformation analysis using any deformation analysis method (for example, SBAS). N complex vectors represent an image composed of an image signal from which the phase gradient of the object to be analyzed has been eliminated from the SAR image according to the phase gradient model. In other words, the N complex vectors represent an image in which the components of the object to be analyzed is enhanced. Therefore, the deformation analysis method can be used to analyze the deformation of a reflector that exhibits weak reflection that is affected by layover.

When multiple objects to be analyzed exist in the SAR image, the image analysis device can analyze the deformation of multiple reflectors affected by the layover by performing steps S101 to S105 for each of the N SAR images. In the time series analysis of the background technology, a linear phase change model (a model of a time series of phase changes) was prepared in advance, but in this example embodiment, a spatial phase gradient model is used. Therefore, in this example embodiment, it is not necessary to assume a linear model, and a nonlinear deformation of the object to be analyzed can be analyzed.

Example Example Embodiment 2

Figure 4:
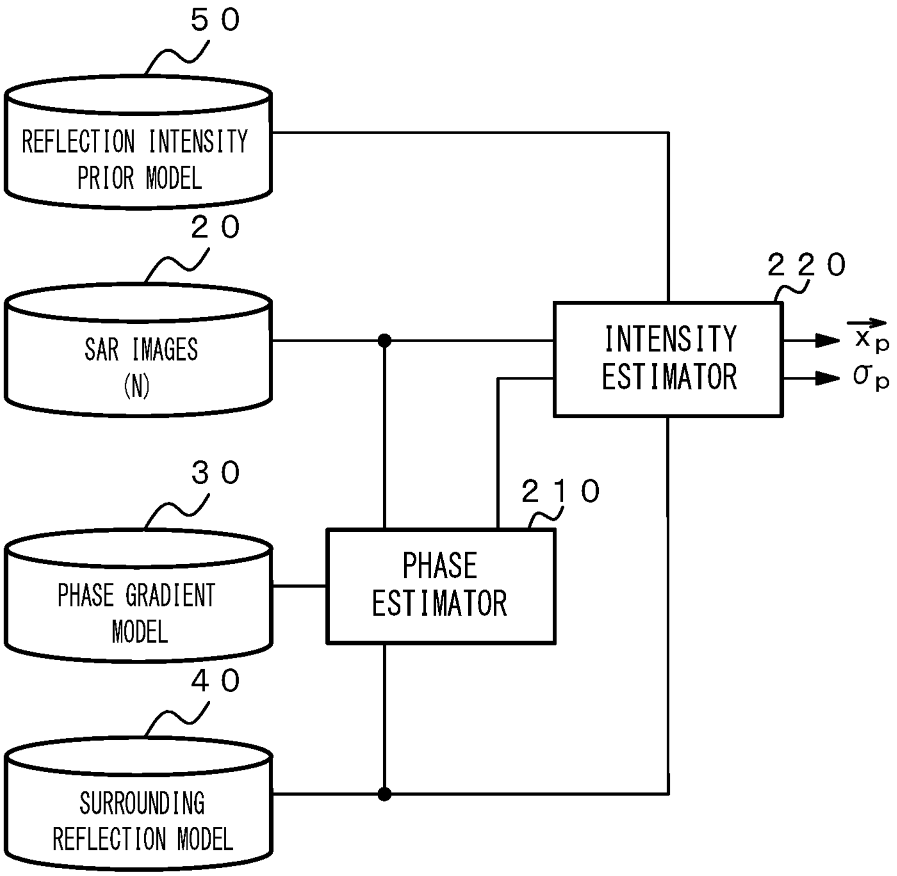
FIG. 4 It depicts a block diagram showing a configuration example of the image analysis device of the second example embodiment.

FIG. 4 is a block diagram showing an example configuration of the image analysis device of the second example embodiment. The image analysis device shown in FIG. 4 includes a phase estimator 210 and an intensity estimator 220. The image analysis device of the second example embodiment uses surrounding reflection model stored in a surrounding reflection model storage 40 and reflection intensity prior model stored in the the reflection intensity prior model storage 50, in addition to the SAR image stored in the SAR image storage 20 and the phase gradient model stored in the phase gradient model storage 30.

Figure 5:
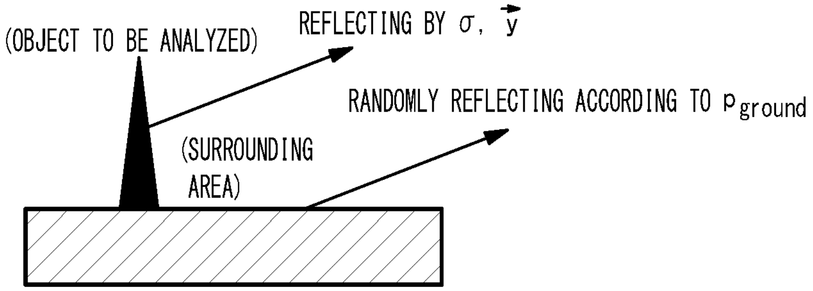
FIG. 5 It depicts an explanatory diagram for explaining a reflection from the object to be analyzed and a surrounding area.

FIG. 5 is an explanatory diagram for explaining a reflection from the object to be analyzed (for example, a transmission steel tower) and a reflection from an area (referred to as a surrounding area) other than the object to be analyzed, in the shooting area in the SAR image. σ indicates a reflection intensity of the object to be analyzed and $\vec{y}_p$ is a complex vector with the phase of the object to be analyzed at pixel p. $p_{ground}$ corresponds to the surrounding reflection model.

The surrounding reflection model is a model that represents the degree of reflection (intensity, state of noise, etc.) from the surrounding area. The area other than the object to be analyzed is an area that can be considered almost flat where the object to be analyzed, such as a transmission steel tower, is collapsed. The reflection intensity prior model is a model that represents the degree of reflection from the object to be analyzed (intensity, state of noise, etc.). In this example embodiment, the image analysis device uses the surrounding reflection model and the reflection intensity prior model to separate the phase of the object to be analyzed from the phase of the surrounding area.

Let a complex vector with the phase of the object to be analyzed at pixel p be $\vec{y}_p$. Let a complex reflection intensity of the object to be analyzed at pixel p be $\sigma_p$. $\sigma_p$ represent a complex reflection intensity that a real observation target (a transmission steel tower) should exhibit.

The observed signal (observed value) of pixel p is expressed by equation (7). N in equation (7) corresponds to the number of SAR images. The reflection intensity prior probability distribution model (reflection intensity prior model) $p_{power}(\sigma_p)$, which represents the prior probability distribution of the complex reflection intensity $\sigma_p$ of the observation target, is expressed by equation (8). In equation (8), σ without a subscript means the complex reflection intensity that is generally assumed to be exhibited by the observation target. The complex vector with the phase of the object to be analyzed is expressed as $\vec{y}_p$ by equation (9). The prior information $p_{grad,n}(y_{n,1}, y_{n,2}, \ldots)$ of the phase gradient at the object to be analyzed in an image with the image number n is expressed by equation (10). The prior information of the phase gradient corresponds to the phase gradient model. The surrounding reflection model $p_{ground}(\vec{x}_g)$ is expressed by equation (11).

Let a vector of pixel values observed at pixel p for N images be $\vec{x}_p$. $\vec{x}_p$ when a complex reflection intensity at pixel p and a complex vector with a phase of the observation target are observed in a superimposed state is expressed by equation (12) as a probability distribution $p_{layover}(\vec{x}_p|\sigma_p, \vec{y}_p)$ for the layover area. In this example embodiment, the layover area is an area in the SAR image where the object to be analyzed and the ground surface around the object to be analyzed are superimposed. $\vec{x}_g$ is a complex vector corresponding to the reflection from the ground surface mixed with the reflection from the object to be analyzed.

[Math. 7]

$$\overrightarrow{x_p} = (x_{1,p}, x_{2,p}, \ldots, x_{N,p})^T \in \mathbb{C}^N \tag{7}$$

$$p_{tower}(\sigma_p) = \frac{1}{\sigma^2}\exp\left(-\frac{|\sigma_p|^2}{\sigma^2}\right) \tag{8}$$

$$\overrightarrow{y_p} \in (y_{1,p}, y_{2,p}, \ldots, y_{N,p})^T \in \mathbb{C}^N \tag{9}$$

$$p_{grad,n}(y_{n,1}, y_{n,2}, \ldots) = Z\ \exp\left((y_{n,1}, y_{n,2}, \ldots)K_n(y_{m,1}, y_{n,2}, \ldots)^H\right) \tag{10}$$

$$p_{ground}(\overrightarrow{x_g}) = \frac{1}{\pi^N\left|\sum_{ground}\right|}\exp\left(-\vec{x}_g^H \textstyle\sum_{ground}^{-1} \vec{x}_g\right) \tag{11}$$

$$p_{layover}(\vec{x}_p|\sigma_p, \vec{y}_p) = p_{gound}(\vec{x}_p - \sigma_p\vec{y}_p) \tag{12}$$

The optimization means (including the phase estimator 210 and the intensity estimator 220) estimates the complex vector $\vec{y}_p$ and the complex reflection intensity $\sigma_p$ that maximizes the following equation (13).

[Math. 8]

$$\prod_p p_{layover}(\overrightarrow{x_p}\,|\,\sigma_p, \overrightarrow{y_p})\, p_{tower}(\sigma_p) \prod_n p_{grad,n}(y_{n,1}, y_{n,2}, \cdots) \tag{13}$$

Next, the operation of image analysis device of this example embodiment will be explained with reference to the flowchart in FIG. 6.

The phase estimator 210 calculates the complex vector $\vec{y}_p$ with the optimal phase from the observed image pixel values $\vec{x}_p$ based on the probability distribution $p_{layover}(\vec{x}_p|\sigma_p, \vec{y}_p)$ of the layover area based on the surrounding reflection model $p_{ground}(\vec{x}_p)$ and the phase gradient model $p_{grad,n}(y_{n,1}, y_{n,2}, \ldots)$ (step S201). Although layover is caused by the superposition of the effect of reflection from a transmission steel tower and the effect of reflection from the ground surface on the pixel in the SAR image, the intensity estimator 220 calculates the optimal u, based on the probability distribution of the layover area $p_{layover}(\vec{x}_p|\sigma_p, \vec{y}_p)$ based on the surrounding reflection model $p_{ground}(\vec{x}_p)$ and the reflection intensity prior model pp, $(\sigma_p)$ (step S202).

The process of step S201 and the process of step S202 are repeated until it is determined that the complex vector $\vec{y}_p$ and the complex reflection intensity $\sigma_p$ have converged to the optimal values (in this example, the maximum values). For example, the intensity estimator 220 determines whether the complex vector $\vec{y}_p$ and the complex reflection intensity $\sigma_p$ have converged to the optimal values.

The intensity estimator 220 outputs the complex vector $\vec{y}_p$ which has become optimal value, i.e., the optimized complex vector $\vec{y}_p$, as the complex vector with the phase of the object to be analyzed (step S203). The intensity estimator 220 also outputs the optimized complex reflection intensity $\sigma_p$ which has become optimal value, i.e., the optimized complex reflection intensity $\sigma_p$, as the complex reflection intensity at pixel p of the object to be analyzed (step S203).

The phase estimator 210 may determine whether the complex vector $\vec{y}_p$ and the complex reflection intensity $\sigma_p$ have converged to the optimal values. The optimization means may be configured so that the process of step S201 and the process of step S202 are performed simultaneously.

In this example embodiment, the optimization means calculates the optimal value of the complex vector $\vec{y}$ and the optimal value of the complex reflection intensity $\vec{\sigma}_p$ that maximizes the value of equation (13) and sets them as the optimal value of the complex vector $\vec{y}_p$ and the optimal value of the complex reflection intensity $\sigma_p$. However, the optimization means may estimate a posterior probability distribution of the complex vector $\vec{y}_p$ and the complex reflection intensity $\sigma_p$ and output the mean, variance, etc. of the posterior probability distribution as the optimized complex vector $\vec{y}_p$ and the optimized complex reflection intensity $\sigma_p$. It should be noted that since no analytical solution is available when estimating the posterior probability distribution, the optimization means may approximate it as a set of samples by MCMC (Markov chain Monte Carlo methods) or the like. The optimization means may also be approximated it as a function that can be analytically handled by a variational Bayesian method or the like.

When performing a calculation on $\Sigma_{ground}$ in the surrounding reflection model (refer to equation (11)), the optimization means may calculate it as the average of $\vec{x}_p \vec{x}_p^H$ which is the direct product of the observed image pixel value $\vec{x}_p$ with its own complex conjugate. The optimization means may also calculate $\Sigma_{ground}$ using a robust covariance matrix estimation method or the like. The optimization means may estimate $\Sigma_{ground}$ based on known information such as season-dependent vegetation changes.

In this example embodiment, since the image analysis device uses a spatial phase gradient model as in the first example embodiment, the image analysis device can analyze a nonlinear deformation of the object to be analyzed. In addition, the image analysis device separates a signal with a phase based on the reflection of the object to be analyzed from a signal with a phase based on the reflection of the surrounding area, using a surrounding reflection model and a reflection intensity prior model. The use of the surrounding reflection model improves the performance of separating the signals into both signals. Further, the obtained complex reflection intensity $\sigma_p$ can be used for recognition of patterns of the object to be analyzed, etc.

Example Example Embodiment 3

Figure 7:
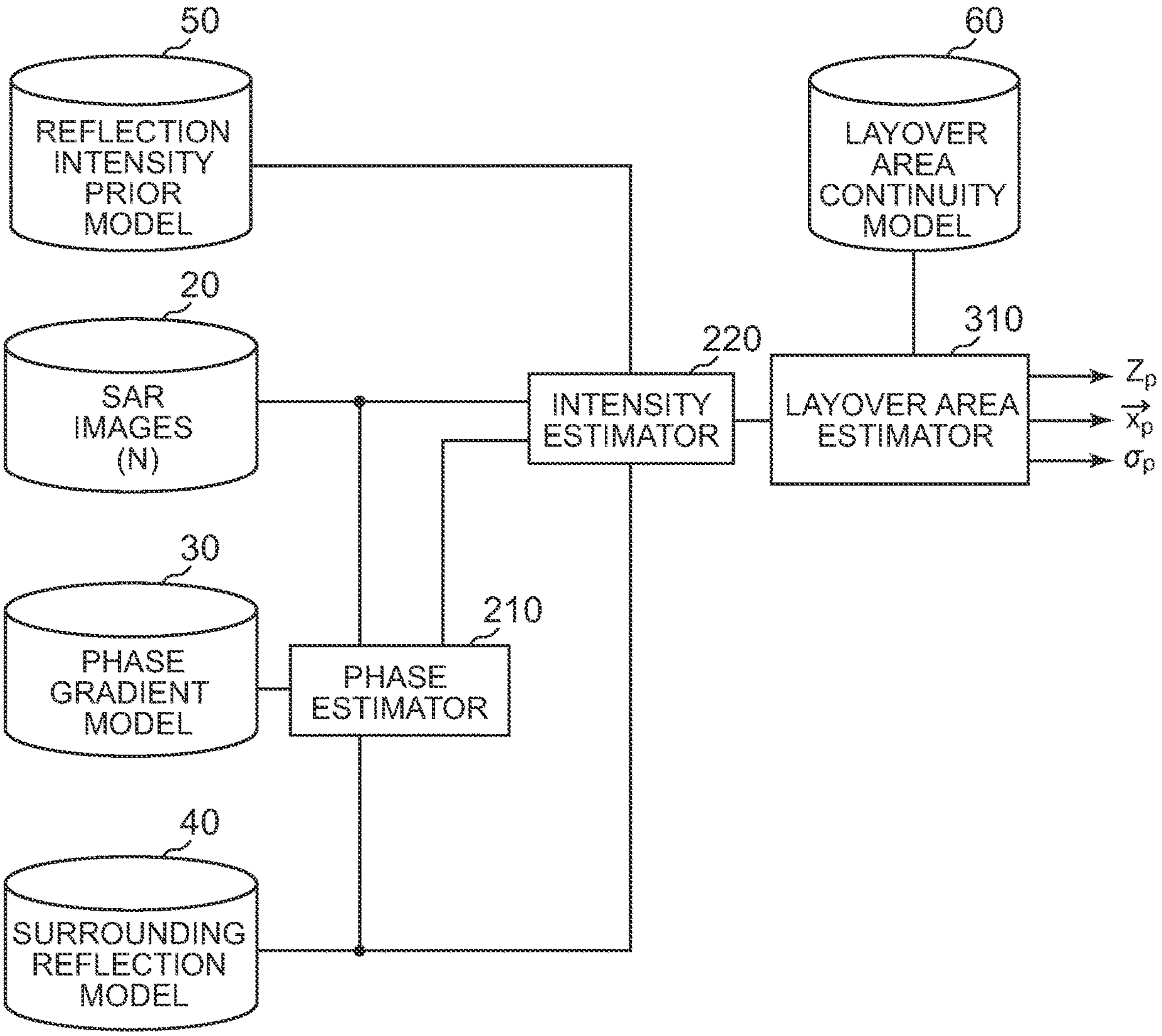
FIG. 7 It depicts a block diagram showing a configuration example of the image analysis device of the third example embodiment.

FIG. 7 is a block diagram showing an example configuration of the image analysis device of the third example embodiment. The image analysis device shown in FIG. 7 has a layover area estimator 310 added to the image analysis device of the second example embodiment shown in FIG. 4. The layover area estimator 310 estimates a layover area using a layover area continuity model stored in a layover area continuity storage unit 60.

When a pixel is a pixel in the layover area, its neighbors are also likely to be pixels in the layover area. The layover area continuity model represents that pixels neighboring a pixel in the layover area also exist in the layover area. When a layover area extends in one direction (corresponding to line-of-sight direction of the satellite) to a high-rise building or a transmission steel tower in a SAR image, a model of the continuity of the layover area with respect to line-of-sight direction of the satellite can be constructed as a Markov model, and a forward backward algorithm or the like can be used to detect the layover area.

Figure 8A:
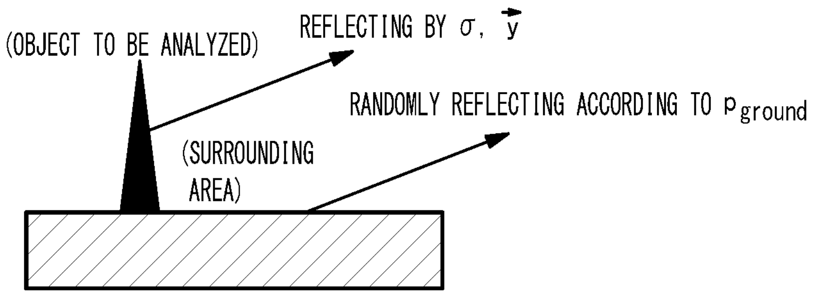
FIG. 8A It depicts an explanatory diagram for explaining the layover area continuity model.
Figure 8B:
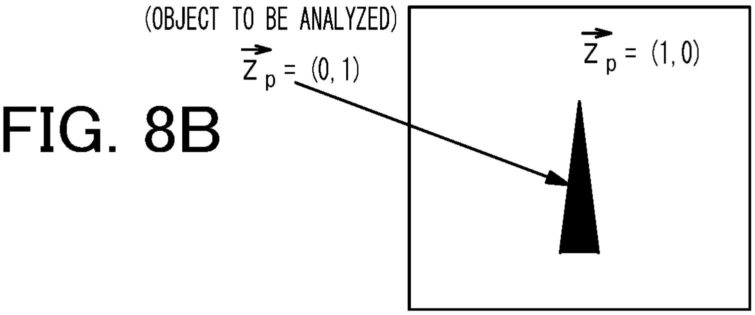
FIG. 8B It depicts an explanatory diagram for explaining the layover area continuity model.
Figure 8C:
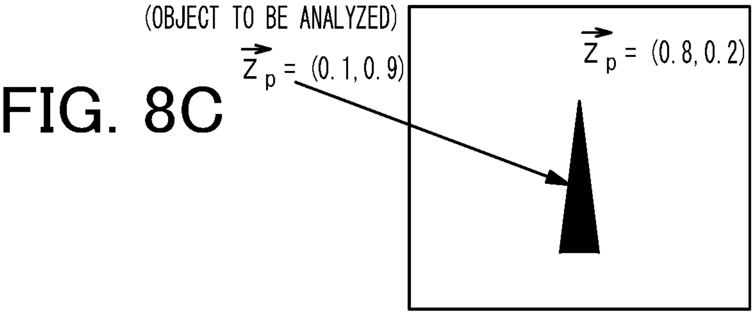
FIG. 8C It depicts an explanatory diagram for explaining the layover area continuity model.

FIGS. 8A to 8C are explanatory diagrams for explaining the layover area continuity model. FIG. 8A shows the same content as in FIG. 5. For example, as shown in FIG. 8B, let one hot vector representing the class (regarding whether it is a layover area or not) at pixel p be $Z^{\rightarrow}_p=(Z_{p,\ ground}, Z_{p,layover})^H$. $Z^{\rightarrow}_p$ is a variable which represents 1 only on the side of the corresponding class and 0 otherwise. The final one hot vector $Z^{\rightarrow}_p$ corresponds to the estimated layover area.

The layover area continuity model is defined, for example, as $p(Z^{\rightarrow}_p|Z^{\rightarrow}_{p-1})=Z^{\rightarrow}_p{}^T AZ^{\rightarrow}_{p-1}$ where A is a matrix representing the intensity of continuity and preserves probability that pixel p is in class i when pixel (p−1) is in class j in row i column j. In other words, the assumption regarding continuity strongly reflects that as the diagonal component of A increases, the probability that the class of pixel (p−1) and the class of pixel p are the same increases, then neighboring pixels should be in the same class continuously. In the layover area continuity model, the performance of detecting consecutive layover areas is improved by setting the probability that neighboring pixels p, (p−1) have the same one hot vector.

In addition, the area that should have consecutive phases is obtained as a result of the layover area estimation. As a result, the deformation analysis method using the output of the image analysis device of this example embodiment shown in FIG. 7 can perform the unwrapping process, which is a process of integrating consecutive phases, more accurately by also using the layover area estimation result.

When the observed value and various probability distributions of pixel p are defined as those in the second example embodiment (refer to above equations (7) to (12)), the optimization means (in this example embodiment, including the phase estimator 210, the intensity estimator 220 and the layover area estimator 310) estimates the complex vector $y^{\rightarrow}_p$ with the phase of the object to be analyzed at pixel p, the complex reflection intensity $\sigma_p$ and the layover area $Z^{\rightarrow}_p$ that maximizes equation (14) below.

[Math. 9]

$$\prod_p p_{layover}(\overrightarrow{x_p}|\sigma_p, \overrightarrow{y_p})^{z_{p,layover}} p_{ground}(\overrightarrow{x_p})^{z_{pground}} p_{tower}(\sigma_p)p(z_p|z_{p-1})\prod_n p_{grad,n}(y_{n,1}, y_{n,2}, \ldots) \tag{14}$$

Figure 9:
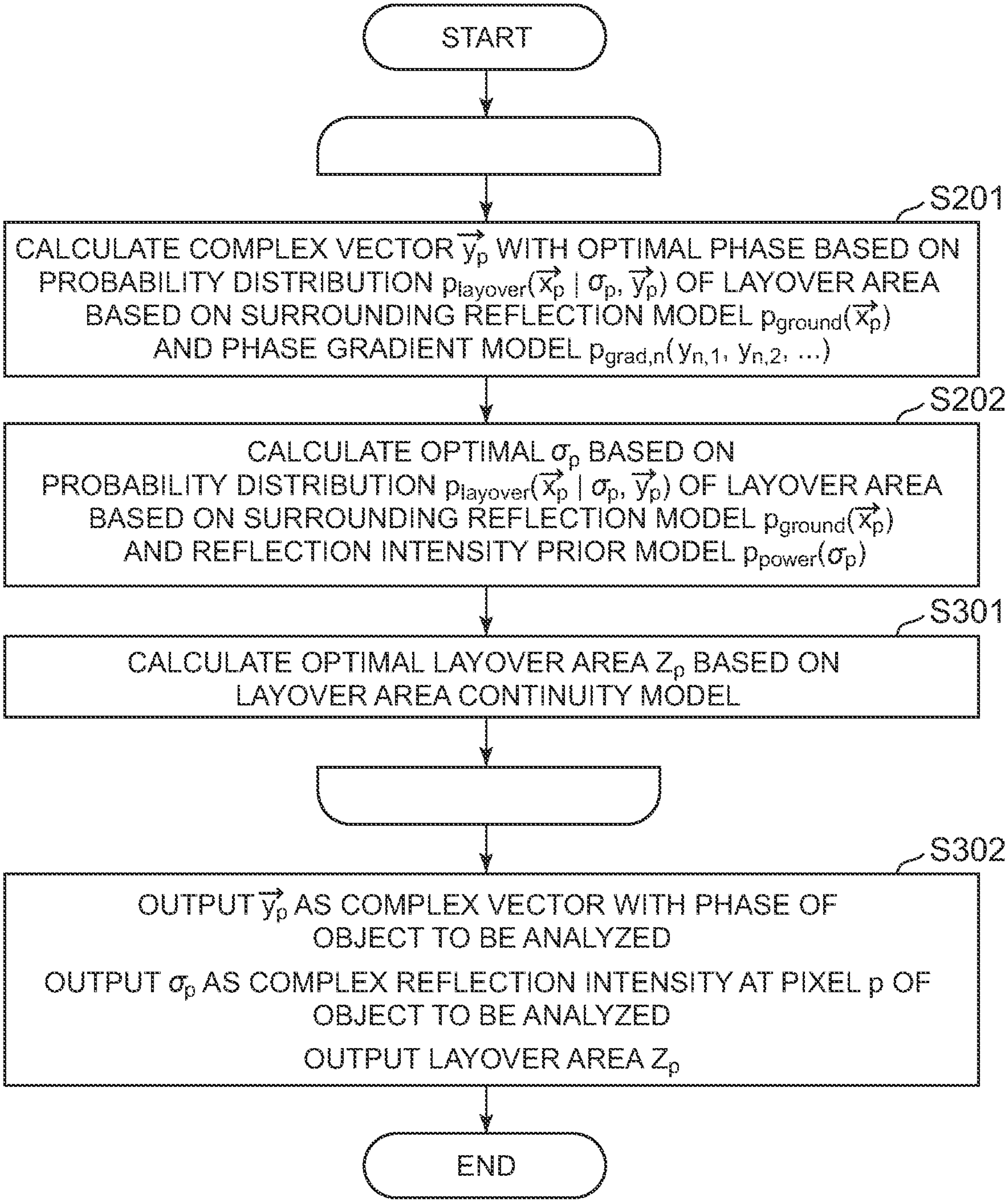
FIG. 9 It depicts a flowchart showing an operation of the image analysis device of the third example embodiment.

Next, the operation of image analysis device of this example embodiment will be explained with reference to the flowchart in FIG. 9.

Figure 6:
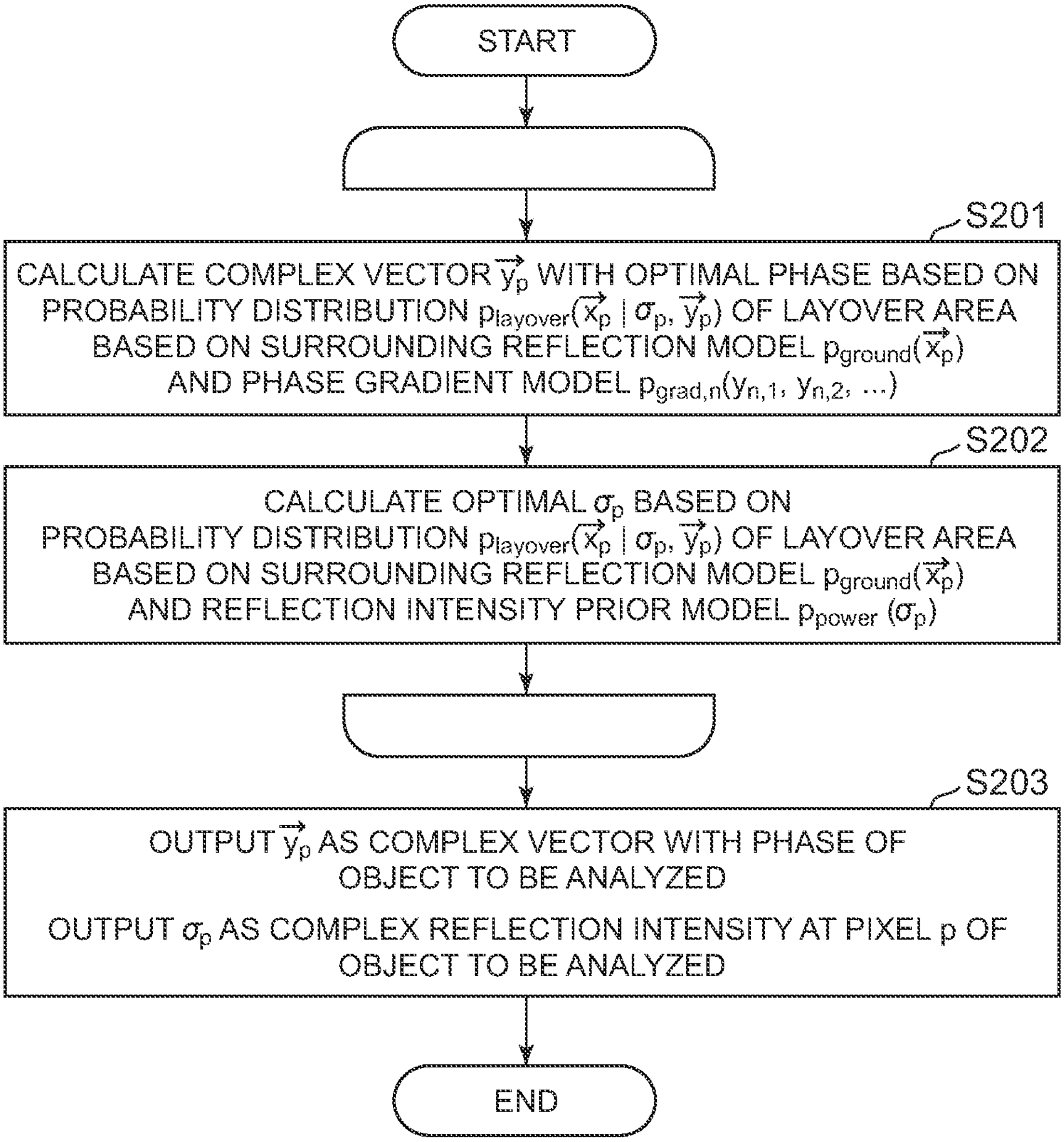
FIG. 6 It depicts a flowchart showing an operation of the image analysis device of the second example embodiment.

The processes of step S201 and step S202 is the same as the processes in the second example embodiment shown in FIG. 6.

The layover area estimator 310 calculates the optimal layover area $Z^{\rightarrow}_p$ using the layover area continuity model (step S301).

The process of step S201, the process of step S202, and the process of step S301 are repeated until it is determined that the complex vector $y^{\rightarrow}_p$, the complex reflection intensity $\sigma_p$, and the layover area $Z^{\rightarrow}_p$ converge to the optimal values (in this example, the maximum values). For example, the layover area estimator 310 determines whether the complex vector $y^{\rightarrow}_p$, the complex reflection intensity $\sigma_p$, and the layover area $Z^{\rightarrow}_p$ have converged to the optimal values.

The layover area estimator 310 outputs the complex vector $y^{\rightarrow}_p$ which has become optimal value, i.e., the optimized complex vector $y^{\rightarrow}_p$, as the complex vector with the phase of the object to be analyzed (step S302). The layover area estimator 310 also outputs the complex reflection intensity $\sigma_p$ that has become the optimal value, i.e., the optimized complex reflection intensity $\sigma_p$, as the complex reflection intensity at pixel p of the object to be analyzed (step S302). The layover area estimator 310 also outputs the optimized layover area $Z^{\rightarrow}_p$ which has become optimal value, i.e., the optimized layover area $Z^{\rightarrow}_p$ (step S302).

The phase estimator 210 or the intensity estimator 220 may determine whether the complex vector $y^{\rightarrow}_p$, the complex reflection intensity $\sigma_p$, and the layover area $Z^{\rightarrow}_p$ have converged to the optimal values. The optimization means may be configured such that the process of step S201, the process of step S202, and the process of step S301 are performed simultaneously.

In this example embodiment, the optimization means estimates the layover area $Z^{\rightarrow}_p$ based on equation (14). However, the optimization means may estimate a posterior probability distribution (expected value) of the layover area $Z^{\rightarrow}_p$ and output the mean, variance, etc. of the posterior probability distribution as the optimized layover area $Z^{\rightarrow}_p$, as in the case of estimating the optimal value of the complex vector $y^{\rightarrow}_p$ and the optimal value of the complex reflection intensity $\sigma_p$ in the second example embodiment.

When the posterior probability distribution is used, the layover area $Z^{\rightarrow}_p$ is not expressed as a binary value of 1 and 0, but as a real number greater than 0 such that the sum is 1 as illustrated in FIG. 8C, for example. In this case, each component of $Z^{\rightarrow}_p$ represents the posterior probability of belonging to each class.

Example Example Embodiment 4

Figure 10:
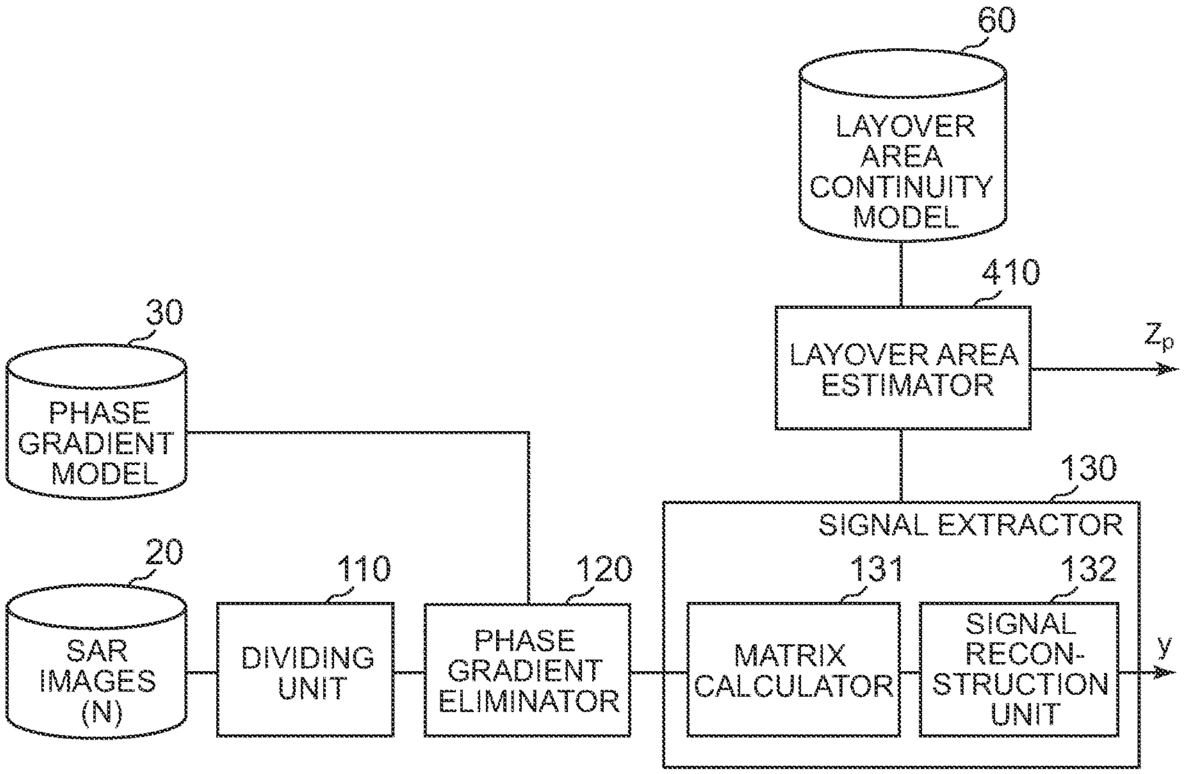
FIG. 10 It depicts a block diagram showing a configuration example of the image analysis device of the fourth example embodiment.

FIG. 10 is a block diagram showing an example configuration of the image analysis device of the fourth example embodiment. The image analysis device shown in FIG. 10 has a layover area estimator 410 added to the image analysis device of the first example embodiment shown in FIG. 2.

Figure 11:
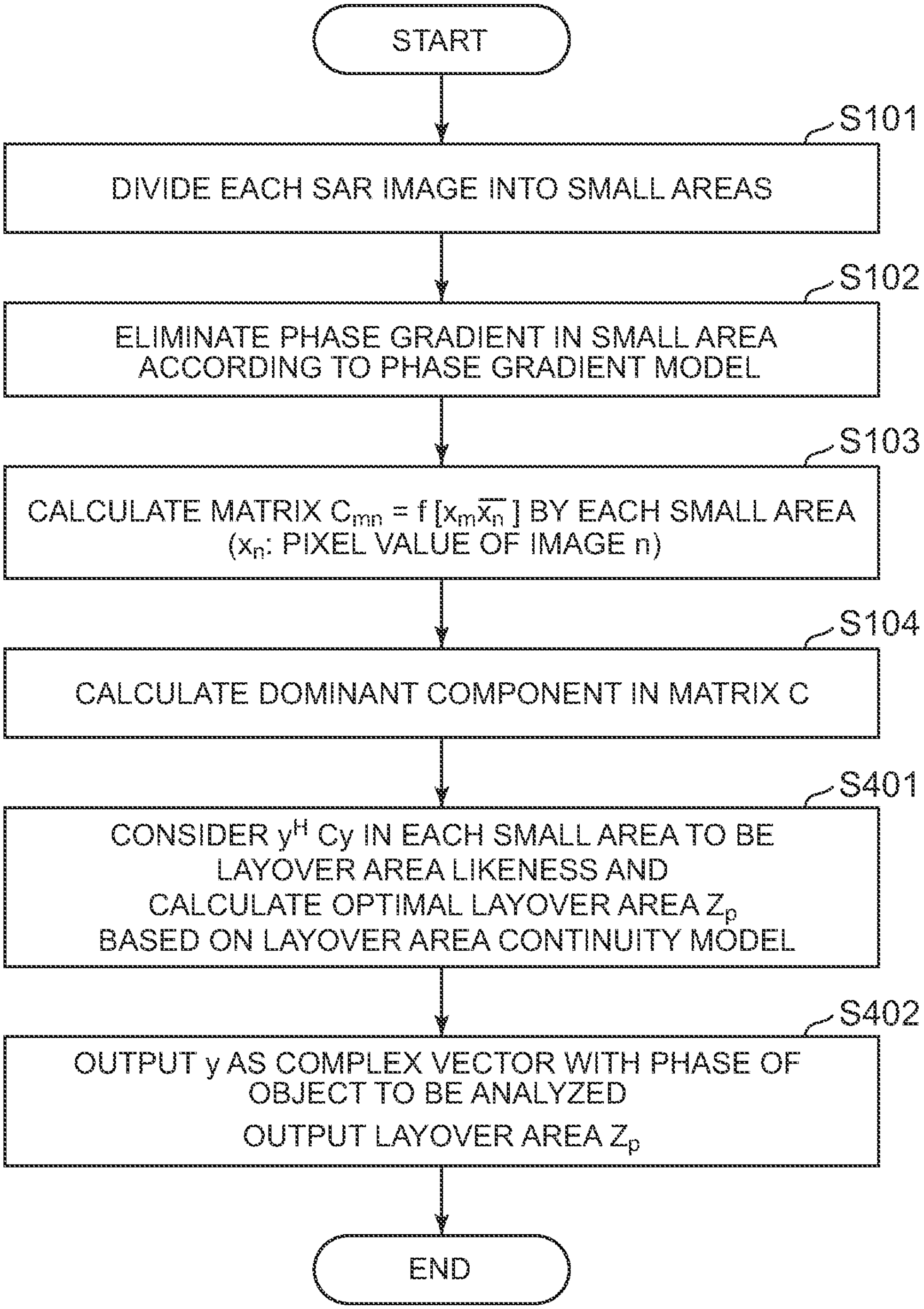
FIG. 11 It depicts a flowchart showing an operation of the image analysis device of the fourth example embodiment.

Next, the operation of image analysis device of this example embodiment will be explained with reference to the flowchart in FIG. 11.

Figure 3:
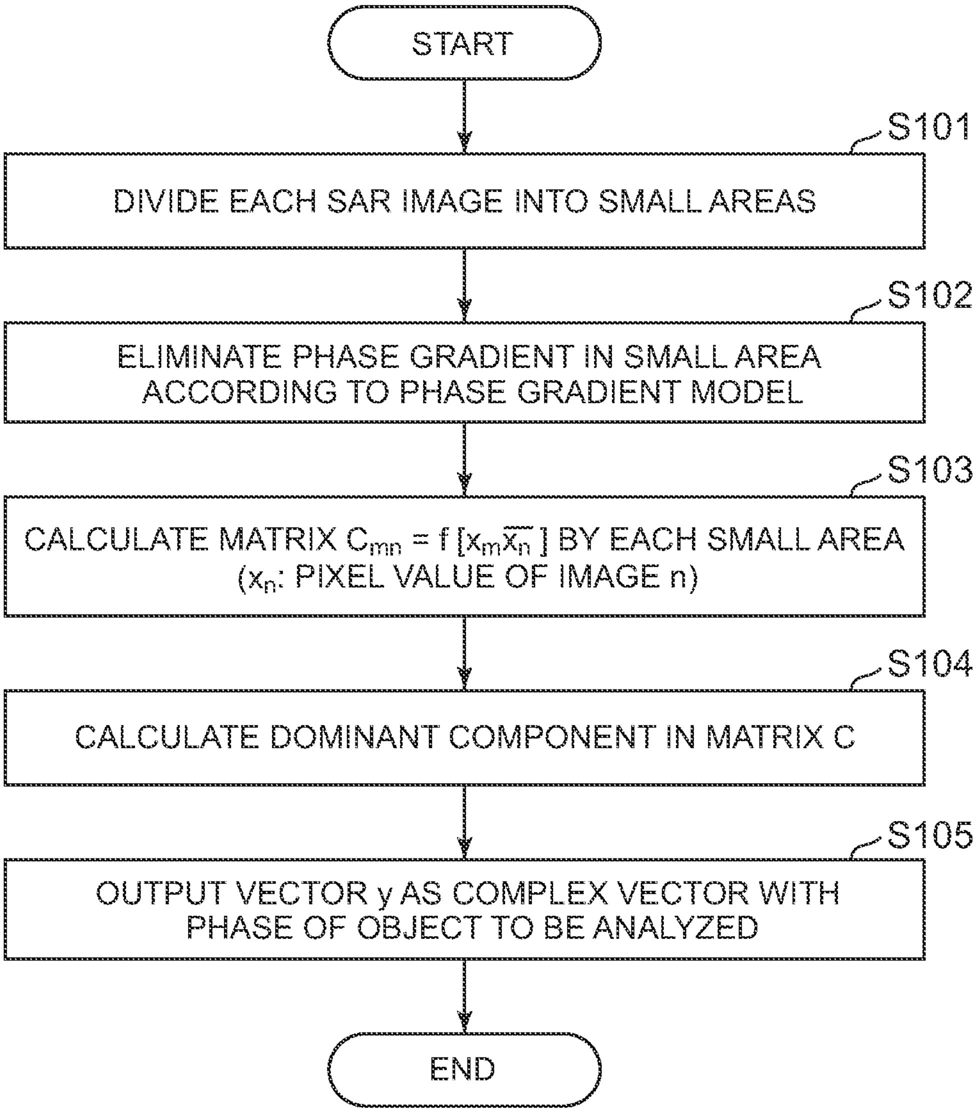
FIG. 3 It depicts a flowchart showing an operation of the image analysis device of the first example embodiment.

The processes from step S101 to step S104 is the same as the process in the first example embodiment shown in FIG. 3.

In this example embodiment, the signal extractor 130 or the layover area estimator 410 calculates the layover area likeness based on the complex vector y with the phase of the object to be analyzed obtained in the process of step S104. Then, the layover area estimator 410 estimates the layover area using the layover area continuity model stored in the layover area continuity storage unit 60.

Specifically, the layover area estimator 410 considers $y^H$ Cy in each small area to be the layover area likeness and calculates the optimal layover area $Z_p$ based on the layover area continuity model (step S401).

The signal reconstruction unit 132 outputs the vector y as a complex vector with the phase of the object to be analyzed (step S402). The layover area estimator 410 also outputs the optimized layover area $\vec{Z}_p$ (step S402).

As in the third example embodiment, also in this example embodiment, an area that should has consecutive phases is obtained as a result of the layover area estimation. As a result, the deformation analysis method using the output of image analysis device of this example embodiment shown in FIG. 10 can perform the unwrapping process, which is a process of integrating consecutive phases, more accurately by also using the layover area estimation result.

As an example, the image analysis devices of each of the above example embodiments can be utilized as follows. For example, the following procedure can be used to quickly finish checking the condition of the transmission steel tower in the event of flooding, etc.

First, the user specifies general locations of transmission steel towers across the country on a map. Then, the user extracts pixels in the SAR image around the transmission steel towers and inputs them to the image analysis device. The image analysis device extracts the phases (i.e., deformations) of the transmission steel towers using the method described above. When a system including the image analysis device, or a system receiving the analysis result from the image analysis device, detects that the ground under the transmission steel tower has been scraped by flooding, etc., it issues an alarm (warning). The user can use the alarm as an opportunity to perform a detailed inspection using different sensor data, etc.

Each component in each of the above example embodiments may be configured with a piece of hardware or a piece of software. Alternatively, the components may be configured with a plurality of pieces of hardware or a plurality of pieces of software. Further, part of the components may be configured with hardware and the other part with software.

The functions (processes) in the above example embodiments may be realized by a computer having a processor such as a central processing unit (CPU), a memory, etc. For example, a program for performing the method (processing) in the above example embodiments may be stored in a storage device (storage medium), and the functions may be realized with the CPU executing the program stored in the storage device.

Figure 12:
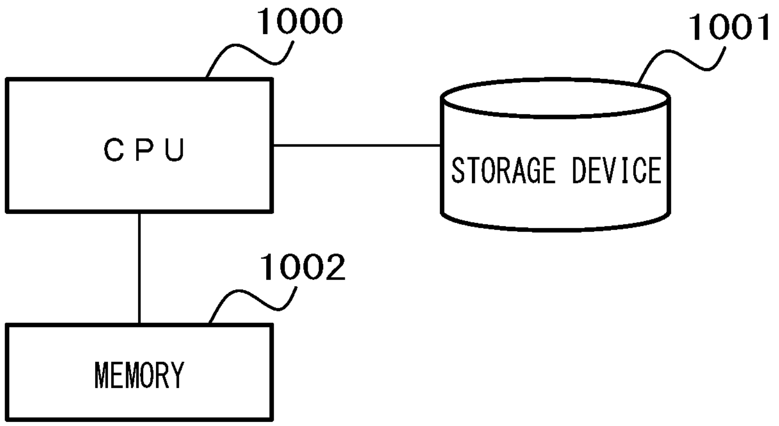
FIG. 12 It depicts a block diagram showing an example of a computer having a CPU.

FIG. 12 is a block diagram showing an example of a computer with a CPU. The computer is implemented in an image processing device. The CPU 1000 executes processing in accordance with a program stored in a storage device 1001 to realize the functions in the above example embodiments. That is to say, the functions of the dividing unit 110, the phase gradient eliminator 120, the signal extractor 130, the matrix calculator 131, the signal reconstruction unit 132, the phase estimator 210, the intensity estimator 220, and the layover area estimators 310, 410 in the image processing devices shown in FIGS. 2, 4, 7, 10 are realized. Instead of CPU 1000, a GPU (Graphics Processing Unit) or a combination of CPU and GPU can be used.

A storage device is, for example, a non-transitory computer readable media. The non-transitory computer readable medium is one of various types of tangible storage media. Specific examples of the non-transitory computer readable media include a magnetic storage medium (for example, hard disk), a magneto-optical storage medium (for example, magneto-optical disc), a CD-ROM (Compact Disc-Read Only Memory), a CD-R (Compact Disc-Recordable), a CD-R/W (Compact Disc-ReWritable), and a semiconductor memory (for example, a mask ROM, a PROM (programmable ROM), an EPROM (erasable PROM), a flash ROM). When a rewritable data storage medium is used as the SAR image storage unit 20, the phase gradient model storage unit 30, the surrounding reflection model storage unit 40, the reflection intensity prior model storage unit 50, and the layover area continuity storage unit 60.

The program may be stored in various types of transitory computer readable media. The transitory computer readable medium is supplied with the program through, for example, a wired or wireless communication channel, i.e., through electric signals, optical signals, or electromagnetic waves.

A memory 1002 is a storage means implemented by a RAM (Random Access Memory), for example, and temporarily stores data when the CPU 1000 executes processing. It can be assumed that a program held in the storage device 1001 or a temporary computer readable medium is transferred to the memory 1002 and the CPU 1000 executes processing based on the program in the memory 1002.

Figure 13:
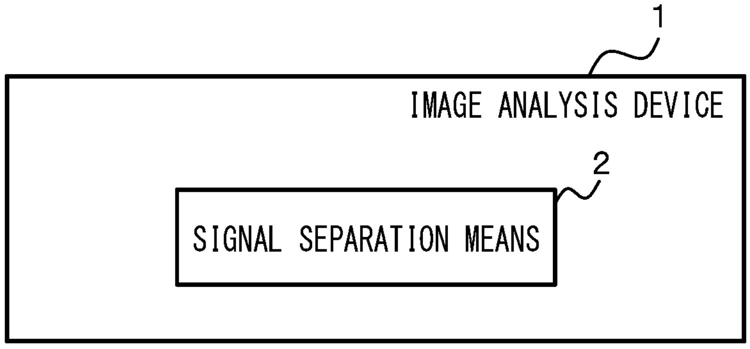
FIG. 13 It depicts a block diagram showing the main part of the image analysis device.

FIG. 13 is a block diagram showing the main part of the image analysis device. The image analysis device 1 shown in FIG. 13 comprises signal separation means 2 (in the example embodiments, realized by the dividing unit 110, the phase gradient eliminator 120 and the signal extractor 130, or the phase estimator 210 and the intensity estimator 220) for inputting a plurality of radar images in which the same area is captured and a phase gradient model representing a phase difference between a plurality of nearby pixels on a surface of an object to be analyzed that may exist in the radar image, and extracting from the radar image a component consistent with the phase difference represented by the phase gradient model.

The signal separation means 2 can include dividing means (in the example embodiments, realized by the dividing unit 110) for dividing the radar image into small areas, phase gradient elimination means (in the example embodiments, realized by the phase gradient eliminator 120) for eliminating the component consistent with the phase difference represented by the phase gradient model from each small area, and signal extraction means (in the example embodiments, realized by the signal extractor 130) for extracting a dominant component in the radar image from which the phase difference has been eliminated.

The signal separation means 2 can include phase estimation means (in the example embodiments, realized by the phase estimator 210) for estimating the phase difference represented by the phase gradient model in the radar image using a surrounding reflection model representing a probability distribution of reflection from surrounding areas which are areas other than the object to be analyzed and the phase gradient model, and intensity estimation means (in the example embodiments, realized by the intensity estimator 220) for estimating an intensity of reflection from the object to be analyzed using a reflection intensity prior probability distribution model representing the intensity of reflection from the object to be analyzed and the phase gradient model.

The image analysis device 1 can comprise layover area estimation means (in the example embodiments, realized by the layover area estimator 310, 410) for estimating an area to be analyzed using a layover area continuity model representing that a pixel neighboring the pixel of the object to be analyzed also likely to be a pixel of the object to be analyzed.

Although the invention of the present application has been described above with reference to example embodiments, the present invention is not limited to the above example embodiments. Various changes can be made to the configuration and details of the present invention that can be understood by those skilled in the art within the scope of the present invention.

REFERENCE SIGNS LIST

1 Image analysis device
2 Signal separation means
10 Signal separation unit
20 SAR image storage unit
30 Phase gradient model storage
40 Surrounding reflection model storage
50 Reflection intensity prior model storage
60 Layover area continuity storage
110 Dividing unit
120 Phase gradient eliminator
130 Signal extractor
131 Matrix calculator
132 Signal reconstruction unit
210 Phase estimator
220 Intensity estimator
310, 410 Layover area estimator
1000 CPU
1001 Storage device
1002 Memory

The invention claimed is:

1. An image analysis device comprising:
a memory storing software instructions, and
one or more processors configured to execute the software instructions to:
input:
a plurality of radar images in which the same area is captured; and
a phase gradient model indicating phase change on a surface of a reflector exhibiting weak reflection, the phase gradient model representing a phase difference between a plurality of nearby pixels on a surface of an object to be analyzed that may exist in the plurality of radar images;
extract from the plurality of radar images a component consistent with the phase difference represented by the phase gradient model; and
determine a part of the plurality of radar images corresponding to components consistent with the phase difference is a surface of a reflector exhibiting weak reflection.

2. The image analysis device according to claim 1, the one or more processors further configured to execute the software instructions to:
divide the plurality of radar images into small areas,
eliminate the component consistent with the phase difference represented by the phase gradient model from each small area, and
extract a dominant component in the plurality of radar images from which the phase difference has been eliminated.

3. The image analysis device according to claim 1, the one or more processors further configured to execute the software instructions to:
estimate the phase difference represented by the phase gradient model in the plurality of radar images using a surrounding reflection model representing a probability distribution of reflection from surrounding areas which are areas other than the object to be analyzed and the phase gradient model, and
estimate an intensity of reflection from the object to be analyzed using a reflection intensity prior probability distribution model representing the intensity of reflection from the object to be analyzed and the phase gradient model.

4. The image analysis device according to claim 1, the one or more processors further configured to execute the software instructions to:
estimate an area to be analyzed using a layover area continuity model representing that a pixel neighboring the pixel of the object to be analyzed also likely to be a pixel of the object to be analyzed.

5. An image analysis method comprising:
inputting:
a plurality of radar images in which the same area is captured; and
a phase gradient model indicating phase change on a surface of a reflector exhibiting weak reflection, the phase gradient model representing a phase difference between a plurality of nearby pixels on a surface of an object to be analyzed that may exist in the plurality of radar images,
extracting from the plurality of radar images a component consistent with the phase difference represented by the phase gradient model; and
determine a part of the plurality of radar images corresponding to components consistent with the phase difference is a surface of a reflector exhibiting weak reflection.

6. The image analysis method according to claim 5, further comprising:
dividing the plurality of radar images into small areas,
eliminating the component consistent with the phase difference represented by the phase gradient model from each small area, and
extracting a dominant component in the plurality of radar images from which the phase difference has been eliminated.

7. The image analysis method according to claim 5, further comprising:
estimating the phase difference represented by the phase gradient model in the plurality of radar images using a surrounding reflection model representing a probability distribution of reflection from surrounding areas which are areas other than the object to be analyzed and the phase gradient model, and
estimating an intensity of reflection from the object to be analyzed using a reflection intensity prior probability distribution model representing the intensity of reflection from the object to be analyzed and the phase gradient model.

8. The image analysis method according to claim 5, further comprising:
estimating an area to be analyzed using a layover area continuity model representing that a pixel neighboring the pixel of the object to be analyzed also likely to be a pixel of the object to be analyzed.

9. A non-transitory computer readable recording medium storing an image analysis program causing a computer to execute:

inputting a plurality of radar images in which the same area is captured and a phase gradient model indicating phase change on a surface of a reflector exhibiting weak reflection, the phase gradient model representing a phase difference between a plurality of nearby pixels on a surface of an object to be analyzed that may exist in the plurality of radar images, and extracting from the plurality of radar images a component consistent with the phase difference represented by the phase gradient model; and determining a part of the plurality of radar images corresponding to components consistent with the phase difference is a surface of a reflector exhibiting weak reflection.

* * * * *